United States Patent

[11] 3,534,799

[72] Inventor John A. Luton
4335 Napier St., San Diego, California 92110
[21] Appl. No. 737,024
[22] Filed June 14, 1968
[45] Patented Oct. 20, 1970

[54] TIRING TRUING MACHINE
5 Claims, 5 Drawing Figs.
[52] U.S. Cl. ................................................. 157/13
[51] Int. Cl. ............................................. B29h 21/08
[50] Field of Search ........................................ 157/13

[56] References Cited
UNITED STATES PATENTS
2,765,845 10/1956 Bullis............................ 157/13
2,852,073 9/1958 Rawls........................... 157/13
3,003,545 10/1961 Peacock....................... 157/13

Primary Examiner—Granville Y. Custer, Jr.
Attorney—Knox and Knox

ABSTRACT: The machine has a frame on which is a driven roller for rotational driving contact with a vehicle tire. A carriage slidably mounted on the frame carries a crossfeed tool support, the carriage being linked to the frame by an adjustable radius rod to follow a predetermined arcuate path when the crossfeed is operated, so guiding the tool in the desired path across the face of the rotating tire. Means are provided for precise setting of the cutting tool and for controlled adjustments while the machine is in operation.

Fig. 3

Patented Oct. 20, 1970

INVENTOR.
JOHN A. LUTON
BY
Knox & Knox

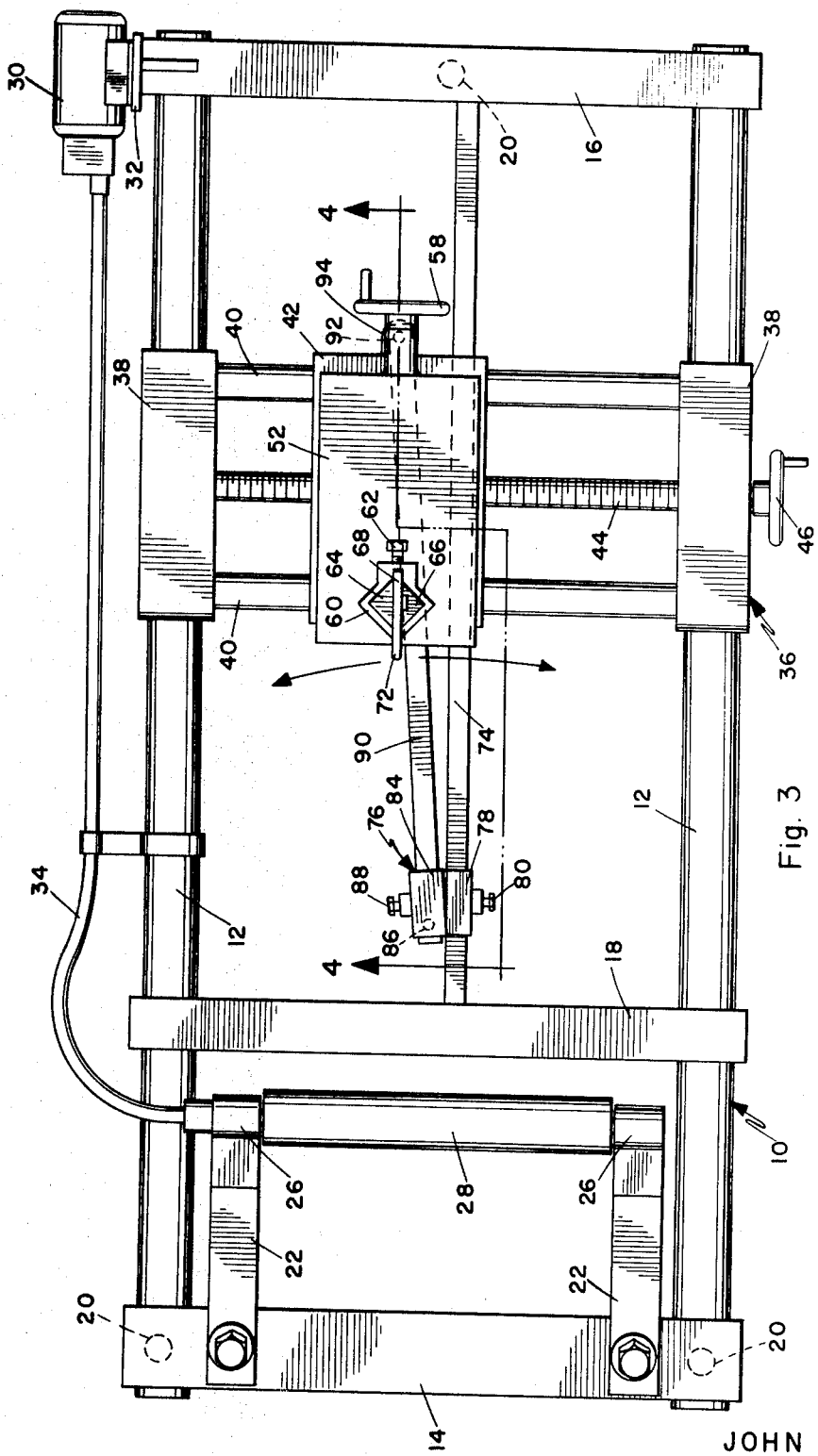

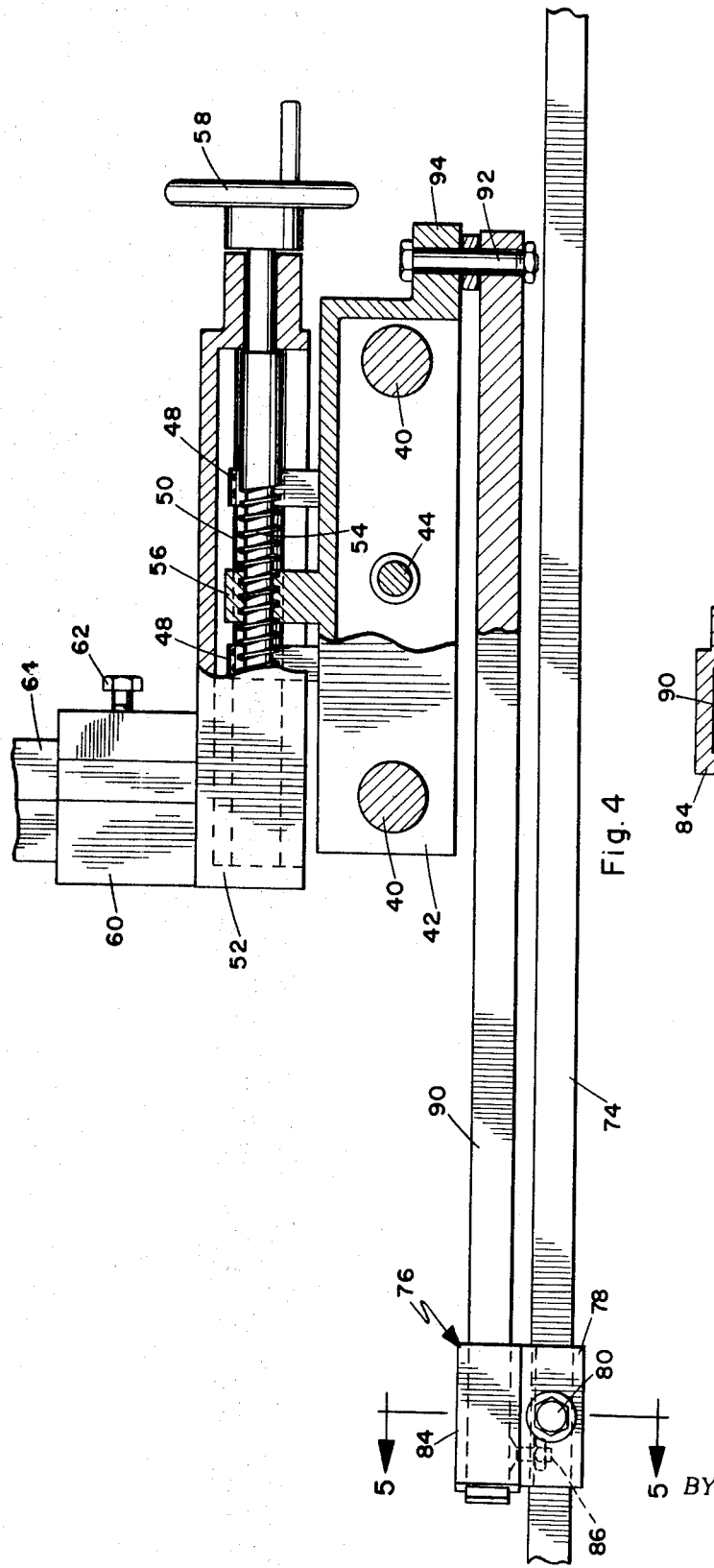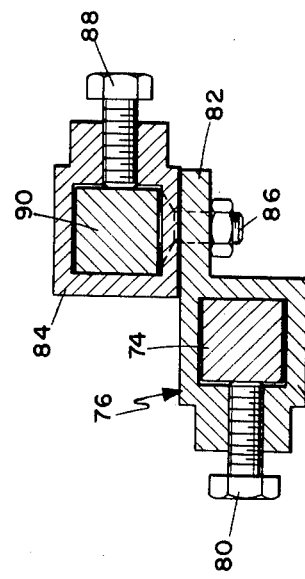

TIRING TRUING MACHINE

BACKGROUND OF THE INVENTION

The present invention relates to vehicle servicing equipment and specifically to a tire-truing machine. In the usual operation of tire-truing, a template is used to guide the cutting tool to the correct profile across the face of the tire. Setting up the apparatus is time-consuming and considerable skill is required to perform the operation properly, since an undercut will usually not correct imbalance and an overcut will reduce the useful life of the tire.

SUMMARY OF THE INVENTION

The tire-truing machine described herein does not require a template, but utilizes a tool carrier coupled to a radius rod to swing in a controlled arcuate path. The machine is built on a rigid frame which can be moved into position under a vehicle wheel, still mounted on the vehicle, the wheel being rotated by a driven roller in frictional contact with the tire and maintained at a controlled suitable speed for efficient cutting. Adjustment is provided for the length of the radius, the position of the center of radius relative to the wheel, the positioning of the cutting tool and the depth of cut, and control of the feed as the machine is operated. The machine is self-contained and all operating controls are readily accessible from one operator's position, at which there is a clear view of the cutting action.

BRIEF DESCRIPTION OF THE DRAWINGS

FIG. 3 is a top plan view of the machine;

FIG. 4 is an enlarged sectional view taken on line 4-4 of FIG. 3; and

FIG. 5 is a further enlarged sectional view taken on line 5-5 of FIG. 4.

Similar characters of reference indicate similar or identical elements and portions throughout the specification and throughout the views of the drawings.

DESCRIPTION OF THE PREFERRED EMBODIMENT

Figure 1:
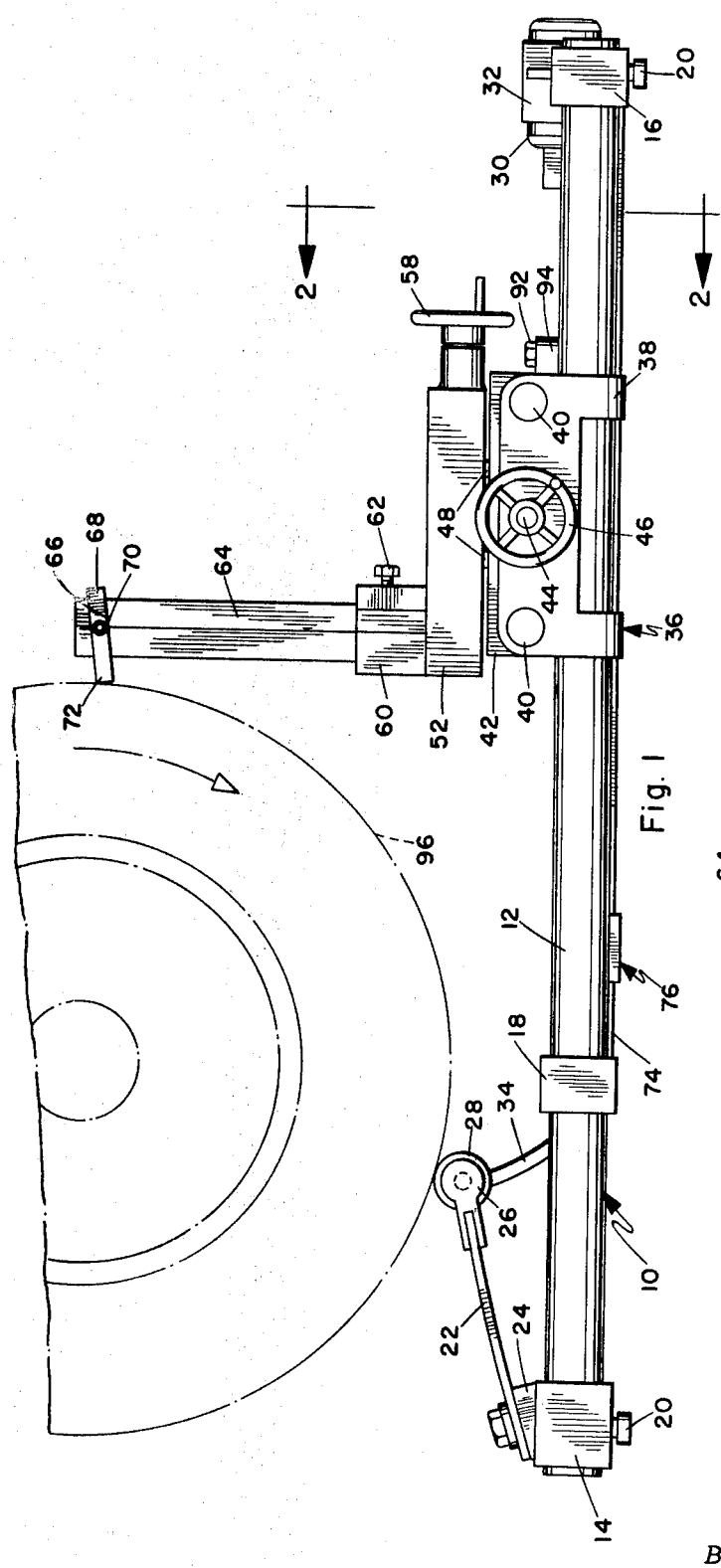
FIG. 1 is a side elevation view of the complete machine.
Figure 2:
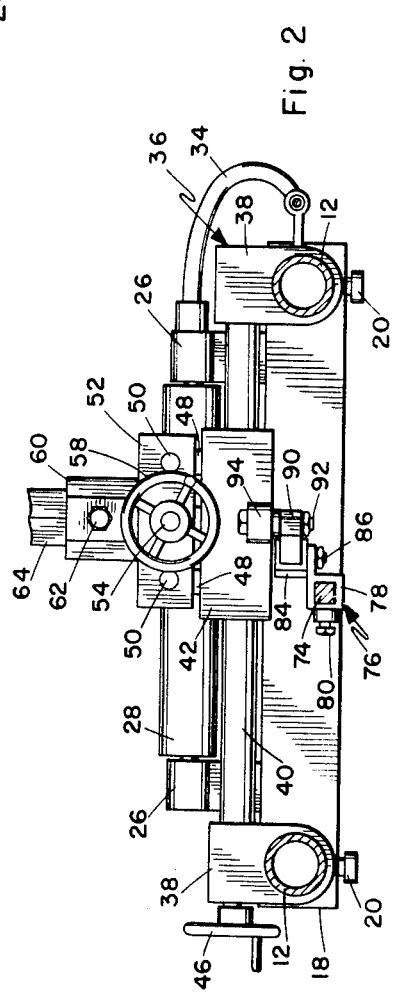
FIG. 2 is a sectional view taken on line 2-2 of FIG. 1.

The machine has a rigid base frame 10, comprising a pair of elongated side rails 12 fixed in spaced parallel relation between crossbeams 14 and 16 at opposite ends of the frame. For purposes of description the crossbeam 14 will be referred to as at the forward end and the crossbeam 16 at the rear end, in relation to the direction in which the operator will normally face. An intermediate crossbeam 18 is secured between the rails a short distance rearwardly from crossbeam 14. To support the frame on the floor, feet 20 are fitted below the ends of crossbeams 14 and the center of crossbeam 16, the feet being of any suitable adjustable type for leveling purposes. Alternatively the machine could be mounted on casters with locking means, the structure being well known.

Secured to the top of crossbeam 14 near the ends are two leaf springs 22 extending rearwardly in parallel relation toward crossbeam 18 and inclined upwardly, as by use of wedge blocks 24. On the upper ends of springs 22 are bearings 26, between which is journaled a drive roller 28. To minimize obstructions in the working area, the motor 30 for driving roller 28 is mounted at the rear end of frame 10 on a bracket 32 secured to an end of crossbeam 16, and is coupled to the roller by a flexible drive shaft 34.

Mounted on a frame 10 is a slide carriage 36 having a pair of slide blocks 38 which are slidable on rails 12 and are interconnected by spaced parallel guide bars 40 extending laterally across the frame above the side rails. Slidably mounted on guide bars 40 is a cross carriage 42, the position of which is controlled by a lateral feed screw 44 journaled between slide blocks 38 and threaded through a portion of the cross carriage. One end of feed screw 44 is fitted with a hand wheel 46 for manual operation of the cross carriage. On top of cross carriage 42 are upright posts 48 supporting a pair of spaced parallel guide bars 50 which are horizontally slidable longitudinally through the posts. Attached to guide bars 50 is a tool platform 52, in which is a longitudinal feed screw 54 extending between guide bars 50 and passing through a threaded post 56 on cross carriage 42. On the rear end of feed screw 54 is a hand wheel 58 for manual adjustment of the tool platform. The basic two-axis screw feed mechanism for moving the cross carriage and tool platform is well known and specific structure may vary from that shown.

Fixed on the forward end of tool platform 52 is a socket member 60 with a clamp screw 62 to hold a tool post 64 in upright position in the socket member. The tool post is shown as being square in cross section, but other noncircular configurations may be used to prevent the tool post from turning. At the upper end the tool post 64 has a recessed shoulder 66 on which a cutting tool 68 is secured by a lock screw 70, with the cutting end 72 of the tool extending forward of the platform. While various types of cutting tools may be used, it has been found that a conventional tire-grooving tool will perform satisfactorily.

Secured longitudinally between crossbeams 16 and 18 is a fixed tie bar 74 on which is an adjustable pivot block 76. The pivot block comprises a sleeve member 78 slidable on tie bar 74, with a lock screw 80 for locking at any position on the tie bar, the sleeve member having a flange 82 to which a second sleeve member 84 is pivotally attached by a vertical center pin 86. Sleeve member 84 has a lock screw 88 to secure one end of a radius bar 90, the other end of which is connected by a pivot pin 92 to a lug 94 on the rear lower portion of cross carriage 42, as in FIGS. 4 and 5. The tie bar 74 is positioned slightly to one side of the longitudinal center line of the frame 10, to allow the axis of center pin 86 to fall on the center line for symmetrical travel of the carriage assembly. When hand wheel 46 is turned to rotate feed screw 44, the cross carriage 42 is moved laterally across the frame, but the radius bar 90 causes the cross carriage to move in an arcuate path having a radius equal to the distance between the centers of pins 86 and 92. To accommodate the longitudinal displacement in the arcuate path, the slide carriage 36 slides on rails 12. Thus only the hand wheel 46 need be operated to move the carriage assembly through its preset path.

In use, the tire to be treated is left on the vehicle, which is jacked up so that the truing machine can be placed underneath. The vehicle is then lowered so that the tire 96, indicated in broken line in FIG. 1, rests on roller 28 with sufficient pressure for driving contact, the resiliency of springs 22 maintaining the contact. Pivot block 76 is adjusted to set the radius and center of radius for the required tire profile, and the tool platform 52 is adjusted by means of hand wheel 58 to bring the tool 68 into cutting position adjacent the tire. The depth of cut can be accurately set by means of hand wheel 58 and will be held at that setting during the lateral motion across the tire. However, if it is necessary to modify the arcuate contour slightly this is easily done while the machine is in operation, the cutter and controls being conveniently placed for access by the operator. With the feed screw control, adjustments to the cutter can be predetermined as specific fractions of a turn of hand wheel 58 and are thus repeatable, without the need for a template or special guide means.

By means of the adjustable pivot block 76 the apparatus can be set for any of the usual tire sizes, so that the cutting tool is properly positioned when the tire is in driving position on the roller 28. For very small or very large tires a tool post 64 of suitable length would be used to hold the cutting tool in the most effective cutting position.

It is understood that minor variation from the form of the invention disclosed herein may be made without departure from the spirit and scope of the invention, and that the specification and drawings are to be considered as merely illustrative rather than limiting.

I claim:

1. A tire-truing machine, comprising:

an elongated, rigid base frame having a driven tire-engaging roller mounted thereon adjacent one end;

a carriage assembly slidably mounted on said frame for adjustment longitudinally of the frame and having a portion (42) thereof separately slidable transversely of the frame;

a tool holder secured to said portion of said carriage assembly and having a cutting tool thereon extending toward said roller;

said carriage assembly including feed means to move said portion relative to the remainder of said assembly; and a single radius bar (90) pivotally connected between said frame and said portion only.

2. The structure of claim 1 and including a longitudinal tie bar (74) fixed in said frame, a pivot block (76) longitudinally adjustably secured (80) to said tie bar and comprising the center of radius pivot connection of said radius bar, the radius bar being adjustably secured (88) to said pivot block.

3. The structure of claim 1, wherein said frame has spaced parallel side rails, said carriage assembly including a slide carriage longitudinally slidable on said rails and having transverse guide bar means (40), said portion of the carriage assembly comprising a cross carriage laterally slidably mounted on said guide bar means for movement across said slide carriage.

4. The structure of claim 3, wherein said radius bar is directly and pivotally connected to said cross carriage.

5. The structure of claim 3, and including a longitudinal tie bar fixed in said frame, a pivot block longitudinally adjustably secured to said tie bar and comprising the center of radius pivot connection of one end of said radius bar, the other end of said radius bar being pivotally connected to said cross carriage.